Nov. 20, 1962
W. R. GRANER
3,065,350
METHOD FOR DETERMINING UNIFORMITY OF FINISH
ON FIBROUS GLASS REINFORCEMENT
Filed March 9, 1959
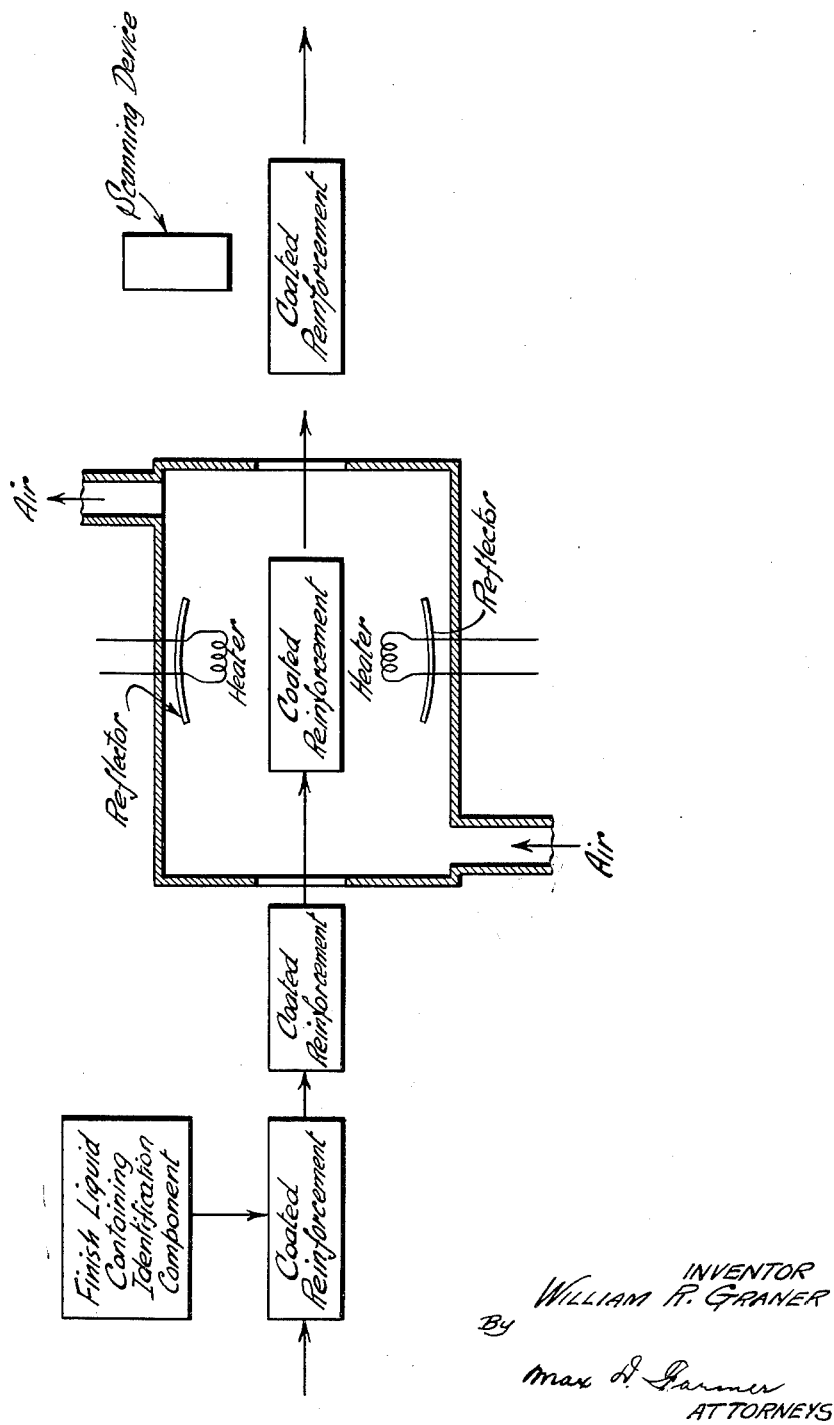
INVENTOR
WILLIAM R. GRANER
By
Max H. Garmer
ATTORNEYS United States Patent Office 3,065,350
Patented Nov. 20, 1962

3,065,350
METHOD FOR DETERMINING UNIFORMITY OF FINISH ON FIBROUS GLASS REINFORCEMENT
William R. Graner, 3934 1st St. SW., Washington, D.C.
Filed Mar. 9, 1959, Ser. No. 798,310
10 Claims. (Cl. 250—106)
(Granted under Title 35, U.S. Code (1952), sec. 266)

The invention described herein may be manufactured and used by or for the Government of the United States of America for governmental purposes without the payment of any royalties thereon or therefor.

This invention relates to the determination of the uniformity in the "finish" that is applied to fiber glass reinforcement for incorporation in resinous and plastic bodies, by a continuous inspection of "finished" glass filter reinforcement before it is incorporated in the resinous or plastic body. Fibrous glass reinforcement is being extensively employed in resinous or plastic bodies such as, for example, those bodies formed of polyester, epoxy, and phenolic resins, and other resins and plastics to form laminated sheets, shapes and structures which have high strength so weight ratios, toughness and many other virtues. The fibrous reinforcement may be in different forms including woven cloth, random mat, rovings, woven rovings and yarn. This reinforcement is commonly given a surface treatment or coating, for its fibers, commonly called a "finish," to improve the adhesion between the glass fibers and the resin or plastic, and to improve the wet strength of the laminated or reinforced body. Uniform application of this "finish" to the glass fibers is extremely important to the production of high quality, high wet strength laminates.

Heretofore no satisfactory method has been available for continuously and non-destructively inspecting the "finished" glass reinforcement to determine that the "finish" coating has been uniformly applied before the treated reinforcement is incorporated in a resinous or plastic body, and thus provide a procedure useful for quality control and a basis for acceptance or rejection of "finished" glass reinforcement.

The procedure comomnly heretofore in use is a spot-check arrangement which is destructive, in that it involves cutting of samples from the roll or bolt of reinforcement, making a laminate panel with the sample, and testing such panel for its wet strength retention (i.e. its ratio of its strength after immersion in water to its dry strength) to determine the efficiency of the finish. This method is unsatisfactory because, since it is a spot check, it does not adequately determine the uniformity of the finish throughout all of the roll or bolt. It has been found that the finish may vary in uniformity to a considerable extent throughout the roll or bolt of the reinforcement.

Objects of this invention are to provide an inspection technique and method by which one may easily, rapidly and continuously determine the uniformity of the finish throughout the entire bolt or roll of the reinforcement, without damage to or destruction of any of the reinforcement, and which is relatively simple, practical, accurate and inexpensive.

Other objects and advantages will be apparent from the following description of examples of the invention, and the novel features thereof will be particularly pointed out hereinafter in connection with the appended claims.

The accompanying drawing is a schematic diagram illustrating the succession of steps of the invention.

This invention contemplates the addition to the finish liquid, before it is applied to the reinforcement, of an identifying component which will be uniformly mixed or chemically synthesized with the finish liquid. This mixture of finish liquid and identifying component is then applied in the usual or any suitable manner to the glass fiber reinforcement, in woven fabric, yarn, roving, random mat, or other condition, in which it is to be used, as uniformly as possible. This application of the modified finish may be for example, by completely dipping or immersing the reinforcement into the finish liquid or solution containing the identifying component, in batches or continuously passing the reinforcement through a body of the finish liquid, after which the treated reinforcement with its applied finish coating is dried, and, if necessary, washed and dried again.

This dried and coated reinforcement of glass fibers may then be progressively and cotninuously scanned by the use of any suitable detection means that determines the uniformity of the identifying component along this dried, coated reinforcement. Preferably the coated reinforcement is passed progressively along a selected path and inspected in its travel in that path. The particular detection means employed will depend upon the nature of the identifying component in the finish coating, and any of those detection means available in the market may be employed. Advantageously this detection means may be one which will give a signal when there is any variation in the amount of applied, modified finish coating beyond an established limit, or apply a mark on any area of the passing reinforcement that may not conform to this limit, or it may continuously record all variations in the amount of finish coating in the areas passing the scanner.

The identifying component may, for example, be a radioactive tracer such as "Chromium-51" or "Carbon-14." When a radioactive tracer is used, the scanning means employs a device, many of which are available in the market, to indicate the variations in the radiations from such modified finish coating on the passing reinforcement. One such device is the well-known Geiger counter, but others are available. The identifying component may also be a stable type of dye, fluorescent or otherwise, which is mixed with the finish liquid before application of that liquid or finish to the reinforcement. Ultra-violet, X-ray or other radiation may be used in the scanner to excite fluorescence in the dye, and visual, spectroscopic or colorimetric techniques may be employed to determine that uniformity in the dispersion of such dyes in the passing, coated reinforcement, and hence of the uniformity of the "finish" on the fibrous glass reinforcement.

The finishes now available, generally speaking, fall into two categories, which are (1) a chromium-methacrylate-complex known commercially as "Volan" which is produced by the E. I. du Pont Co., and (2) the silane type such as is produced by such concerns as Libbey-Owens-Ford Corp. under the name "Garan," by the Linde Corp., by the Bjorksten Research Laboratories, and under the name of NOL 24 by the Naval Ordinance Laboratory. These are only examples of presently available finishing liquids, and are not intended to be a limiting list of possible finishing liquids.

In the schematic diagram of the process appearing in the drawing, the finishing liquid containing therein the identifying component is applied in any suitable manner as a coating on the reinforcement, the coated reinforcement then passed through a suitable dryer where the coating is dried or fixed to the reinforcement, and then the reinforcement with its dried or fixed coating on its fibers passed along a selected path continuously, whlie it is scanned in passing by any suitable scanning means as explained earlier herein. While glass fibers are commonly used as reinforcement of resinous and plastic bodies, this term is intended to include as equivalents, the various mineral and other fibers that are, or may become, available, and which are suitable for use as reinforcement for resinous and plastic bodies.

It will be understood that various other changes in the steps, details and materials, which have been herein disclosed in order to explain the nature of the invention, may be made by those skilled in the art within the principle and scope of the invention as expressed in the appended claims.

I claim:
1. The method of continuously and non-destructively inspecting finished glass fiber reinforcement for resinous and plastic bodies to determine that the finish has been uniformly applied to such reinforcement, which comprises incorporating in the finishing liquid to be applied an identifying component, applying such mixture to such reinforcement, drying the reinforcement so treated with a finish liquid containing said component, passing the said dried component along a selected path, and scanning the passing reinforcement with such applied finish for irregularities in the uniformity of said identifying component on said passing reinforcement as an indication of irregularities in the application of such finish liquid.

2. The method according to claim 1, wherein said identifying component is a radioactive tracer, and said scanning detects radiations from said tracer in the finish material on said reinforcement.

3. The method according to claim 1, wherein said identifying component is a stable type of dye, and said scanning detects the presence of said dye.

4. The method according to claim 2, wherein said scanning step detects any variation in the uniformity of said applied finish coating beyond a selected limit.

5. The method of non-destructively inspecting finished mineral fiber reinforcement for resinous and plastic bodies to determine that the finish liquid has been uniformly applied as a coating to the reinforcement, which comprises adding an identifying component to the finish liquid to be applied to the reinforcement, before the finish liquid is applied to the reinforcement, applying such mixture of finish liquid and identifying component to the reinforcement as a coating on the fibers of the reinforcement, drying the thus coated reinforcement, and then scanning the dried and coated reinforcement progressively lengthwise for irregularities in the uniformity of said identifying component on said reinforcement as an indication of irregularities in the uniformity of said finish on said reinforcement.

6. In the method of manufacturing laminated panels of resinous materials having a group of ceramic fibers in the form of an elongated body forming one of the laminations, in which such fibrous body is pretreated prior to lamination with a liquid surface finish capable of increasing the adherence between the fibers and the resinous material, that improvement in such method which comprises incorporating uniformly in said finish liquid, prior to the application of such liquid to the fibers, an identifying component, and then, before such finish treated body of fibers is laminated with the resinous materials, scanning such finish treated body of fibers progressively lengthwise by detection of such component on the body of fibers, and discarding any portion of the finish-treated, scanned body of fibers that lacks uniformity in the application thereto of such finish as indicated by lack of uniformity of said component along said body of fibers.

7. The method according to claim 6, wherein said identifying component is a radioactive tracer, and said scanning is by detection of radiations from said tracer in said finish material which was applied to said fibrous body.

8. The method according to claim 6 wherein said identifying component is a stable type of dye which can be rendered visible by an exciting light, and the scanning step includes the application of such an exciting light to make the dye visible while visually viewing the fibrous body under such light.

9. The method according to claim 6, wherein said identifying component is a radioactive tracer capable of being chemically synthesized with the finish liquid.

10. The method according to claim 6, wherein said identifying component is a radioactive tracer selected from the group consisting of a chromium-methacrylate-complex type and a silane type.

References Cited in the file of this patent

UNITED STATES PATENTS

| | | |
|---|---|---|
| 2,378,328 | Robinson et al. | June 12, 1945 |
| 2,478,951 | Stokely et al. | Aug. 16, 1949 |
| 2,640,788 | Rockett | June 2, 1953 |
| 2,671,033 | Waggoner | Mar. 2, 1954 |
| 2,793,345 | Hags | May 21, 1957 |
| 2,797,171 | Fralish | June 25, 1957 |
| 2,915,639 | Gilbert et al. | Dec. 1, 1959 |
| 2,952,563 | O'Gorman et al. | Sept. 13, 1960 |
| 2,977,925 | Norton | Apr. 4, 1961 |
| 2,993,258 | Spunt | July 25, 1961 |

OTHER REFERENCES

Kramer: Radioactive Isotopes as Tracers, in Power Plant Engineering, November 1947, pp. 105–108.

Cooper, $C^{14}$ Tracer Measures Fuel Distribution, Nucleonics, June 1957, pages 136 to 140.